(12) United States Patent
Cole et al.

(10) Patent No.: US 9,875,495 B2
(45) Date of Patent: Jan. 23, 2018

(54) METHOD AND APPARATUS FOR PURCHASING DIGITAL PLAYLISTS

(75) Inventors: Vallance Cole, Santa Cruz, CA (US); Glenn Epis, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 1920 days.

(21) Appl. No.: 11/849,802

(22) Filed: Sep. 4, 2007

(65) Prior Publication Data
US 2009/0063292 A1    Mar. 5, 2009

(51) Int. Cl.
*G06Q 30/06* (2012.01)
*G06Q 20/34* (2012.01)
*G06Q 30/02* (2012.01)

(52) U.S. Cl.
CPC ....... *G06Q 30/0603* (2013.01); *G06Q 20/354* (2013.01); *G06Q 30/02* (2013.01); *G06Q 30/0635* (2013.01); *G06Q 30/0643* (2013.01)

(58) Field of Classification Search
USPC .......................................................... 705/26
See application file for complete search history.

(56) References Cited

U.S. PATENT DOCUMENTS

| | | |
|---|---|---|
| 846,064 A | 3/1907 | Souder |
| 3,346,294 A * | 10/1967 | Sartz ................. 294/49 |
| 4,319,684 A | 3/1982 | Backman et al. |
| 4,828,105 A | 5/1989 | Silengo et al. |
| 5,036,645 A | 8/1991 | Schwarz |
| 5,135,157 A | 8/1992 | Cruz |
| 5,139,454 A | 8/1992 | Earnest |
| 5,143,279 A | 9/1992 | Gaines |
| 5,219,184 A | 6/1993 | Wolf |
| 5,263,586 A | 11/1993 | Keable |
| D344,757 S | 3/1994 | Kruyt |
| 5,467,917 A | 11/1995 | Potter |
| 5,516,033 A | 5/1996 | Bernetich |
| 5,573,117 A | 11/1996 | Adams |
| 5,575,384 A | 11/1996 | Saye |
| 5,626,551 A | 5/1997 | Kearns et al. |
| 5,641,115 A | 6/1997 | Brewster |

(Continued)

FOREIGN PATENT DOCUMENTS

| | | |
|---|---|---|
| EP | 0725376 | 8/1996 |
| EP | 0927945 | 7/1999 |

(Continued)

OTHER PUBLICATIONS

"list." Dictionary of Publishing and Printing. London: A&C Black, 2006. Credo Reference [online][retrieved on Jul. 10, 2009]. Retrieved from: <http://www.credoreference.com/entry/acbpublishing/list>.*

(Continued)

*Primary Examiner* — Rutao Wu
*Assistant Examiner* — Monica A Mandel
(74) *Attorney, Agent, or Firm* — DLA Piper LLP US

(57) ABSTRACT

Digital media products and methods for making them are disclosed. A digital media product can effectively not have any value until purchased and activated at a point-of-sale. In one embodiment, the digital media product is content specific and provided to allow acquisition of a particular collection of digital media assets upon activation. As one example, the collection can pertain to a playlist, album or set of content.

27 Claims, 11 Drawing Sheets

(56) References Cited

U.S. PATENT DOCUMENTS

| | | | |
|---|---|---|---|
| 5,645,214 A | 7/1997 | Taganas | |
| 5,650,209 A | 7/1997 | Ramsburg et al. | |
| 5,687,992 A | 11/1997 | Finkelshteyn | |
| 5,755,375 A | 5/1998 | Rogers | |
| 5,760,381 A | 6/1998 | Stich et al. | |
| 5,791,474 A | 8/1998 | Hansen | |
| D400,919 S | 11/1998 | Pickel | |
| 5,842,629 A | 12/1998 | Sprague et al. | |
| 5,845,425 A | 12/1998 | Leake et al. | |
| 5,862,979 A | 1/1999 | Hill et al. | |
| 5,906,063 A | 5/1999 | Magee, Sr. | |
| 5,918,909 A | 7/1999 | Fiala et al. | |
| 5,941,573 A | 8/1999 | Yordinsky | |
| 5,946,834 A | 9/1999 | Bradley | |
| 5,963,915 A | 10/1999 | Kirsch | |
| 5,963,916 A | 10/1999 | Kaplan | |
| 5,981,040 A | 11/1999 | Rich et al. | |
| 5,984,091 A | 11/1999 | Orr et al. | |
| 6,003,254 A | 12/1999 | Lorber | |
| 6,050,415 A | 4/2000 | Lind et al. | |
| 6,053,321 A | 4/2000 | Kayser | |
| 6,070,719 A | 6/2000 | Pollock | |
| 6,092,841 A | 7/2000 | Best et al. | |
| 6,199,912 B1 | 3/2001 | Finkelshteyn | |
| 6,224,108 B1 | 5/2001 | Klure | |
| 6,233,682 B1 | 5/2001 | Fritsch | |
| 6,244,444 B1 | 6/2001 | Jacobus et al. | |
| D447,055 S | 8/2001 | Several et al. | |
| 6,270,012 B1 | 8/2001 | Dawson | |
| 6,299,530 B1 | 10/2001 | Hansted et al. | |
| 6,349,829 B1 | 2/2002 | Matheis et al. | |
| D457,555 S | 5/2002 | Stephens-D'Angelo et al. | |
| 6,385,596 B1 | 5/2002 | Ansell et al. | |
| 6,418,648 B1 | 7/2002 | Hollingsworth et al. | |
| 6,457,638 B1 | 10/2002 | Schmidt | |
| 6,491,213 B2 | 12/2002 | Purcell | |
| 6,588,596 B1 | 7/2003 | Holmes et al. | |
| 6,619,480 B2 | 9/2003 | Smith | |
| 6,659,271 B2 | 12/2003 | Parsons | |
| 6,698,116 B2 | 3/2004 | Waldron | |
| 6,731,312 B2 | 5/2004 | Robbin | |
| 6,877,263 B2 | 4/2005 | Clark | |
| 6,957,737 B1 | 10/2005 | Frederickson et al. | |
| D512,456 S | 12/2005 | Diaz et al. | |
| 7,040,049 B2 | 5/2006 | Cox et al. | |
| 7,055,740 B1 | 6/2006 | Schultz et al. | |
| 7,080,776 B2 | 7/2006 | Lewis et al. | |
| 7,204,048 B2 | 4/2007 | Kershner et al. | |
| D541,647 S | 5/2007 | Ashby et al. | |
| 7,243,839 B2 | 7/2007 | Beck et al. | |
| D548,279 S | 8/2007 | Gulakos | |
| 7,277,870 B2* | 10/2007 | Mourad et al. | 705/51 |
| 7,278,584 B1* | 10/2007 | Gandel et al. | 235/492 |
| 7,322,519 B2 | 1/2008 | Blank et al. | |
| 7,367,504 B2 | 5/2008 | Lewis et al. | |
| 7,374,095 B2 | 5/2008 | Blank et al. | |
| 7,409,788 B2 | 8/2008 | Lauer et al. | |
| 7,490,720 B2 | 2/2009 | Cole et al. | |
| 7,500,604 B2 | 3/2009 | Holme | |
| 7,546,288 B2* | 6/2009 | Springer et al. | 707/3 |
| 7,584,887 B1 | 9/2009 | Sanchez et al. | |
| 7,607,574 B2 | 10/2009 | Kingsborough et al. | |
| 7,712,741 B2 | 5/2010 | Lambert | |
| 7,740,170 B2 | 6/2010 | Singh et al. | |
| 7,822,640 B2 | 10/2010 | Arthur et al. | |
| 7,837,125 B2 | 11/2010 | Biskupski et al. | |
| 7,896,252 B2 | 3/2011 | Narlinger et al. | |
| 8,256,682 B2 | 9/2012 | Chakiris et al. | |
| 2001/0034703 A1 | 10/2001 | Picciallo et al. | |
| 2001/0040115 A1 | 11/2001 | Wani et al. | |
| 2001/0045738 A1 | 11/2001 | Klure | |
| 2002/0002468 A1 | 1/2002 | Geisler et al. | |
| 2002/0028321 A1 | 3/2002 | Feilen et al. | |
| 2002/0080714 A1* | 6/2002 | Pierson et al. | 369/286 |
| 2002/0088855 A1 | 7/2002 | Hodes | |
| 2002/0147683 A1* | 10/2002 | Capobianco et al. | 705/41 |
| 2002/0157974 A1* | 10/2002 | Krahn | 206/308.1 |
| 2002/0194260 A1* | 12/2002 | Headley et al. | 709/203 |
| 2002/0195816 A1 | 12/2002 | Anise | |
| 2003/0004889 A1* | 1/2003 | Fiala et al. | 705/64 |
| 2003/0018586 A1* | 1/2003 | Krahn | 705/58 |
| 2003/0066777 A1 | 4/2003 | Malone | |
| 2003/0150142 A1 | 8/2003 | Street | |
| 2003/0156686 A1* | 8/2003 | Pines | 379/67.1 |
| 2003/0230501 A1* | 12/2003 | Smolev | 206/232 |
| 2004/0064374 A1* | 4/2004 | Cho | 705/26 |
| 2004/0140361 A1 | 7/2004 | Paul et al. | |
| 2004/0140616 A1 | 7/2004 | Davis | |
| 2004/0254836 A1 | 12/2004 | Barabas et al. | |
| 2004/0267622 A1* | 12/2004 | Taylor et al. | 705/26 |
| 2004/0268386 A1* | 12/2004 | Logan et al. | 725/34 |
| 2005/0017502 A1 | 1/2005 | Chariker | |
| 2005/0100312 A1* | 5/2005 | Commons et al. | 386/46 |
| 2005/0167301 A1* | 8/2005 | Oram | 206/307 |
| 2005/0167910 A1 | 8/2005 | Candler et al. | |
| 2005/0171795 A1* | 8/2005 | Kearby et al. | 705/1 |
| 2005/0182675 A1* | 8/2005 | Huettner | 705/14 |
| 2005/0279825 A1 | 12/2005 | Ashby et al. | |
| 2006/0032764 A1 | 2/2006 | Swenson | |
| 2006/0042986 A1 | 3/2006 | Simkowski | |
| 2006/0065748 A1 | 3/2006 | Halbur et al. | |
| 2006/0086630 A1* | 4/2006 | Cheong et al. | 206/312 |
| 2006/0118618 A1* | 6/2006 | Schultz et al. | 235/380 |
| 2006/0185201 A1* | 8/2006 | Fachon et al. | 40/124.06 |
| 2006/0212401 A1 | 9/2006 | Ameerally et al. | |
| 2006/0224516 A1* | 10/2006 | Lemon et al. | 705/51 |
| 2006/0235864 A1* | 10/2006 | Hotelling et al. | 707/101 |
| 2006/0243609 A1 | 11/2006 | Cole et al. | |
| 2006/0259189 A1 | 11/2006 | Perlow et al. | |
| 2006/0261154 A1 | 11/2006 | Arthur et al. | |
| 2007/0017973 A1 | 1/2007 | Blank et al. | |
| 2007/0038577 A1* | 2/2007 | Werner et al. | 705/59 |
| 2007/0063052 A1 | 3/2007 | Chakiris et al. | |
| 2007/0090184 A1 | 4/2007 | Lockwood et al. | |
| 2007/0154167 A1* | 7/2007 | Ando et al. | 386/82 |
| 2007/0174200 A1* | 7/2007 | Sung-Min et al. | 705/52 |
| 2007/0187492 A1* | 8/2007 | Graves et al. | 235/380 |
| 2007/0198418 A1* | 8/2007 | Macdonald et al. | 705/52 |
| 2007/0208664 A1* | 9/2007 | Ortega | 705/51 |
| 2007/0224969 A1* | 9/2007 | Rao | 455/411 |
| 2007/0267502 A1 | 11/2007 | Zellner et al. | |
| 2007/0278280 A1* | 12/2007 | Wert et al. | 229/80 |
| 2008/0052371 A1* | 2/2008 | Partovi et al. | 709/217 |
| 2008/0116088 A1* | 5/2008 | Roberts | 206/232 |
| 2008/0116089 A1 | 5/2008 | Roberts | |
| 2008/0120609 A1* | 5/2008 | Gates et al. | 717/168 |
| 2008/0154722 A1* | 6/2008 | Galinos | 705/14 |
| 2008/0159715 A1* | 7/2008 | Fuasaro et al. | 386/124 |
| 2008/0188209 A1* | 8/2008 | Dorogusker et al. | 455/414.2 |
| 2008/0190267 A1* | 8/2008 | Rechsteiner et al. | 84/609 |
| 2008/0320139 A1* | 12/2008 | Fukuda et al. | 709/226 |
| 2009/0104539 A1* | 4/2009 | Watanabe et al. | 430/1 |
| 2009/0166422 A1 | 7/2009 | Biskupski | |
| 2009/0218392 A1 | 9/2009 | Biskupski et al. | |
| 2009/0218408 A1 | 9/2009 | Biskupski et al. | |
| 2009/0283594 A1 | 11/2009 | Walton et al. | |
| 2010/0219099 A1 | 9/2010 | Schmitt et al. | |
| 2010/0253063 A1 | 10/2010 | Skogster | |
| 2011/0137793 A1 | 6/2011 | Liggett | |
| 2012/0025516 A1 | 2/2012 | Miller et al. | |
| 2012/0234909 A1 | 9/2012 | Tang | |
| 2012/0259718 A1 | 10/2012 | Miller et al. | |

FOREIGN PATENT DOCUMENTS

| | | |
|---|---|---|
| EP | 1111562 | 6/2001 |
| WO | WO 99/24942 A | 5/1999 |
| WO | WO 00/28461 | 5/2000 |
| WO | WO 00/43852 | 7/2000 |
| WO | WO 00/62265 | 10/2000 |
| WO | WO 01/41023 | 6/2001 |
| WO | WO 01/44908 | 6/2001 |
| WO | WO 01/46786 | 6/2001 |
| WO | WO 01/50305 | 7/2001 |

(56) References Cited

FOREIGN PATENT DOCUMENTS

| WO | WO 02/08869 | 1/2002 |
|---|---|---|
| WO | WO 2004/038567 A | 5/2004 |
| WO | WO 2004/044770 A | 5/2004 |

OTHER PUBLICATIONS

"listing." Collins English Dictionary. London: Collins, 2000. Credo Reference. [online][retrieved on Jul. 11, 2009]. Retrieved from: <http://www.credoreference.com/entry/hcengdict/listing>.*
"bin." Collins English Dictionary. London: Collins, 2000. Credo Reference [online][retrieved on Jul. 13, 2009]. Retrieved from: <http://www.credoreference.com/entry/hcengdict/bin>.*
"container." Collins English Dictionary. London: Collins, 2000. Credo Reference [online][retrieved on Jul. 13, 2009]. Retrieved from: <http://www.credoreference.com/entry/hcengdict/container>.*
"rack 1." Collins English Dictionary. London: Collins, 2000. Credo Reference [online][retrieved on Jul. 13, 2009]. Retrieved from: <http://www.credoreference.com/entry/hcengdict/rack_1>.*
"price." Chambers 21st Century Dictionary. London: Chambers Harrap, 2001. Credo Reference [online][retrieved on Jul. 14, 2009]. Retrieved from: <http://www.credoreference.com/entry/chambdict/price>.*
"allow." Webster's Third New International Dictionary, Unabridged. Merriam-Webster, Incorporated. [online][retrieved on Jul. 15, 2009]. Retrieved from: <http://lionreference.chadwyck.com/searchFulltext.do?id=871261&idType=offset&divLevel=2&queryId=../session/1247680262_19043&area=mwd&forward=refshelf&trail=refshelf>.*
"value." Webster's Third New International Dictionary, Unabridged. Merriam-Webster, Incorporated. [online][retrieved on Jul. 15, 2009]. Retrieved from: < http://lionreference.chadwyck.com/search Fulltext.do?id=38664807&idType=offset&divLevel=2&queryId=../session/1247683362_2487&area=mwd&forward=refshelf&trail=refshelf>.*
"media." Chambers 21st Century Dictionary. London: Chambers Harrap, 2001. Credo Reference [online][retrieved on Jul. 15, 2009]. Retrieved from: <http://www.credoreference.com/entry/chambdict/media>.*
"associate." Collins English Dictionary. London: Collins, 2000. Credo Reference [online] [retrieved on Jul. 16, 2009]. Retrieved from: <http://www.credoreference.com/entry/hcengdict/associate>.*
"active." Webster's Third New International Dictionary, Unabridged. Merriam-Webster, Incorporated. [online][retrieved on Jul. 16, 2009]. Retrieved from: < http://lionreference.chadwyck.com/searchFulltext.do?id=313560&idType=offset&divLevel=2&queryId=../session/1247778592_27918&area=mwd&forward=refshelf&trail=refshelf>.*
"activate." Webster's Third New International Dictionary, Unabridged. Merriam-Webster, Incorporated. [online][retrieved on Jul. 16, 2009]. Retrieved from: < http://lionreference.chadwyck.com/searchFulltext.do?id=312239&idType=offset&divLevel=2&queryId=../session/1247778879_29216&area=mwd&forward=refshelf&trail=refshelf>.*
The Bank Credit Card Business. 2nd Edition. American Bankers Association, Washington D.C., 1996. pp. 1-3,63-89.*
Smart Card Handbook, 2nd Edition. W.Rankl and W.Effing. John Wiley and Sons, West Sussex, England, 2000. pp. 1-25.*
"Identification Cards—Recording Technique—Part 7: Magnetic Strip—High Coercivity, High Density", ISO Standard, ISO/IEC 7811-7:2004 downloaded Dec. 26, 2007, 2 pgs.
"American National Standard Specifications for Credit Cards", American National Standards Institute, Inc. (ANSI), x4.13/1971, 1971, 18 pgs.
"American National Standard Magnetic-Stripe Encoding for Credit cards", American National Standards Institute, Inc. (ANSI), x4.16/1976, 1976, 12 pgs.
"Identification Cards-Recording Technique", International Standard ISO/IEC, vol. 7811-2, No. Third Edition, Feb. 1, 2001, pp. 1-21.
Offenberg, J. "Markets—Gift Cards", Journal of Economic Perspectives, vol. 21, No. 2, Spring 2007, pp. 227-238.
International Search Report and Written Opinion for PCT US2008/074953, dated Dec. 12, 2008.
European Search Report for EP 08163672, dated Dec. 12, 2008.
U.S. Appl. No. 12/197,975, entitled "Carrier Card Arrangement with Removable Envelope", filed Aug. 25, 2008.
Office Action for European Patent Application No. 08163672.2, dated Jan. 27, 2009.
Summons to Attend Oral Proceedings pursuant to Rule 115(1) EPC for EP Application No. 08163672.2 dated Nov. 5, 2009.
International Preliminary Report for International Application No. PCT/US2008/074953, dated Mar. 9, 2010.

* cited by examiner

METHOD AND APPARATUS FOR PURCHASING DIGITAL PLAYLISTS

BACKGROUND OF THE INVENTION

Gift cards or prepaid cards value are often given as gifts to others or to oneself. A gift card generally does not have any monetary value until it is sold and activated, at which time a value or amount is associated with the card. Later, when the gift card is used to make a purchase, information stored on a barcode or magnetic stripe of the gift card is used, e.g., indirectly, to identify the amount associated with the gift card.

The ability to purchase digital media items (e.g., music) for use with digital audio and video players allows owners of the digital audio and video players to efficiently download music onto their players. Gift cards or prepaid cards issued for websites that allow digital audio and/or video files to be purchased or otherwise obtained allow an owner of a gift card to use the monetary value of the gift card to purchase desired media items and thus download corresponding digital audio and/or video files. Online stores that allow monetary values associated with gift cards to be redeemed for arbitrary media items associated with digital audio and/or video files include the iTunes® online media store owned and operated by Apple Inc. of Cupertino, Calif.

Typically, a possessor of a gift card for use at a online store that sells digital media items, first accesses the online store and identifies a media item that he or she wishes to purchase from a plurality of available media items. When a possessor of a gift card selects a media item to purchase, the account number associated with the gift card may effectively be debited to effectuate the purchase of the media item. In one situation, an account with an online store can established or otherwise replenished by the possessor of the gift card using the value associated with the gift card.

However, if a gift giver wishes to purchase a specific media collection, such as an album, to give as a gift to an owner of a digital audio or video player, the gift giver could purchase a compact disc (CD) for the specific media collection (e.g., album). Alternatively, the gift giver could purchase a gift card for an online store that sells digital media items, and send a note to the gift recipient that the gift card is intended for use to purchase digital media associated with the specific media collection. Gifting the gift recipient with a gift card and a note that instructs the gift recipient to purchase the media collection, however, may not necessarily ensure that the gift recipient actually purchases the specific media collection. The gift recipient is also burdened with the task of locating the specific media collection.

Therefore, what is needed is a method and an apparatus that allows a gift giver to give a gift recipient a particular media collection in a digital, downloadable format.

SUMMARY OF THE INVENTION

Digital media products and methods for making them are disclosed. A digital media product can effectively not have any value until purchased and activated at a point-of-sale. In one embodiment, the digital media product is content specific and provided to allow acquisition of a particular collection of digital media assets upon activation. As one example, the collection can pertain to a playlist, album or set of content.

According to one aspect of the present invention, a method for creating a content-specific digital media product includes identifying at least one element to be included on the content-specific digital media product. The element includes a representation of a predetermined playlist. The method also includes assigning a unique code to the content-specific digital media product that identifies the predetermined playlist, and laying out the content-specific digital media product. Laying out the content-specific digital media product includes determining a first location at which to place the at least one element on a surface of the content-specific digital media product and determining a second location at which to place the unique code on the surface. In addition, the method includes printing the at least one element at the first location and printing the unique code at the second location.

According to another aspect of the present invention, a digital media product associated with a first data store arrangement includes a first element, a code, and an activation element. The first element identifies a playlist that includes at least one digital file. The code is arranged to be transitioned from an unactivated state to an activated state. The code identifies the playlist and allows the playlist to be obtained when the code in the activated state is provided to the online media store. The activation element is arranged to cooperate with a remote activation system to transition the code from the unactivated state to the activated state.

According to another aspect of the present invention, a method includes obtaining information associated with a content-specific digital media product. The digital media product includes a unique code that identifies a first set of content associated with a data store arrangement. The method also includes determining if the information indicates that the unique code is not active, and causing the unique code to be activated if it is determined that the information indicates that the unique code is not active. When the unique code is active, the unique code can be used to be used to obtain the first set of content from the data store arrangement.

According to another aspect of the present invention, a computer program product includes at least code devices that cause information associated with a content-specific digital media product to be obtained, the digital media product including a unique code that identifies a first set of content associated with a data store arrangement; code devices that cause a determination of whether the information indicates that the unique code is not active; and code devices that cause the unique code to be activated if it is determined that the information indicates that the unique code is not active, wherein the code devices that cause the unique code to be activated enable the unique code to be used to obtain the first set of content from the data store arrangement.

According to another aspect of the present invention, a prepaid card for acquisition of a particular collection of digital media assets includes: an image representing the collection of digital media assets; a price for the card; a listing of the digital media assets in the collection; a unique code for the card; a bar code that identifies the card; and download instructions to redeem the card for the collection of digital media assets.

According to still another aspect of the present invention, a method for distribution of digital media assets includes at least: receiving a plurality of digital media products pertaining to one or more collections of digital media assets; placing the digital media products on sale at a retail establishment; and activating at least one of the digital media products once purchased from the retail establishment, the at least one digital media product pertaining to a particular collection of digital media assets. After activation, the at least one digital media product is redeemable for the particular collection of digital media assets from the online media store.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

Figure 1A:
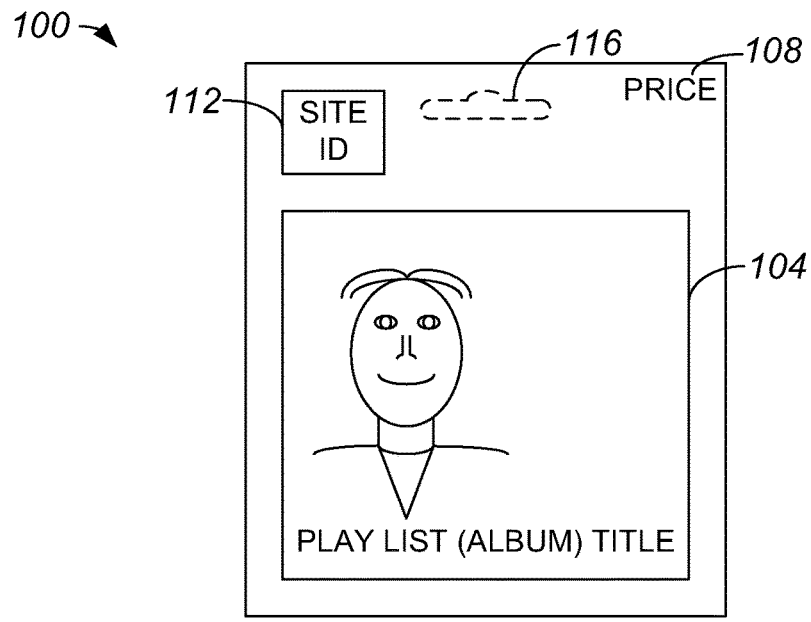
FIG. 1A is a diagrammatic representation of a front of a digital media product or card in accordance with an embodiment of the present invention.

The present invention relates to a digital media product that effectively does not have any value until purchased and activated at a point-of-sale. In one embodiment, the digital media product is content specific and provided to allow acquisition of a particular collection of digital media assets upon activation. As one example, the collection can pertain to a playlist, album or set of content. The digital media product can be embodied as a content specific prepaid card.

In one embodiment, each digital media product associated with a particular playlist has its own associated unique code that, when activated, allows for acquisition of the particular playlist (e.g., album). Hence, when a possessor of a unique code accesses a website (e.g., online media store) that allows for the purchase of digital media assets, and enters the unique code using an appropriate interface, the possessor may acquire the digital files that are associated with the particular playlist effectively identified by the unique code. As such, the possessor is then able to download the playlist to his or her computer and/or digital audio or video player.

A digital media product may be embodied in a variety of different configurations, e.g., form factors. In one embodiment, the digital media product is provided as a card, such as a gift card or a prepaid card.

Allowing a particular album to be represented by a digital media product that is made available for purchase in conventional retail outlets, e.g., retail outlets that sell compact discs (CDs), enables albums to be sold within a gift card network. Embodying a particular album in a digital media product, such as a card, allows a gift giver to efficiently give an album as a gift. The gift giver is able to effectively select a particular album to give as a gift, and the recipient is able to access an appropriate online store to conveniently download the digital files associated with the album. In other words, gift givers have the ability to, in effect, purchase a digital version of a specific album for downloading by a gift recipient. In one embodiment, the recipient is able to directly access or receive the digital files associated with the album without having to search, browse or otherwise select an album for purchase. The gift recipient can thus acquire the specific album intended by the gift without further cost and with ease of use.

Media collections, such as albums, playlists, or sets of content, that are represented on digital media products, such as cards, may be priced such that it is cheaper to purchase a card representing "album A" than it is to purchase "album A" directly, e.g., from an online media store that allows for the downloading of "album A." In one embodiment, a card that represents "album A" may be priced at a first price by a media provider. The card thus allows "album A" to be downloaded without additional cost when the unique code associated with the card is entered. On the other hand, the price for purchase (e.g., downloading) "album A" from the media provider without the benefit of a unique code associated with a card is a second price, which can be higher than the first price. Hence, digital media products may be utilized as promotional, marketing, or incentive pricing. It should be appreciated, however, that the price of a card representing "album A" may instead be substantially the same as the price associated with purchasing "album A" directly.

When retail outlets display content specific digital media products, the retail outlets may display the content specific digital media products along with CDs. In one example, the content specific digital media products may have a size or form factor approximately that of a CD case. Advantageously, a retail outlet may place the content specific media products associated with "album A" in the same display bins as CDs of contain "album A." Alternatively, in another example, retail outlets may display content-specific media products along with gift cards and other prepaid cards. Here, the content specific digital media products may have a size or form factor approximately that of a conventional gift card or gift card holder. In general, however, the manner in which content specific digital media products are displayed may vary depending upon various factors. Various factors may include, but are not limited to including, a marketing plan for the content specific digital media products. The marketing plan for a given retail outlet may target sales of content specific digital media products to the demographics of the retail outlet's customer base. In one implementation, a content specific digital media product might only be available from a particular third-party retailer. Such content specific digital media product may be of interest to the demographics targeted by or associated with the third-party retailer.

Also, in one implementation, a media collection associated with a content specific digital media product might only be available to a possessor of the content specific digital media product. For example, such unique media collections might not be offered for sale on an online media store unless a purchaser has the appropriate content specific digital media product (namely, a unique code from the content specific digital media product).

In one embodiment, content specific digital media products may serve as replacement or alternatives to compact discs (CDs). Since the content specific digital media products have no value until activated, they would not be targets of theft as are conventional CDs. Moreover, a third-party retailer does not have to purchase CDs at wholesale pricing and then wait to make a profit when the CDs are subsequently sold. As such, with content specific digital media products, the third-party retailer does not have the burdensome capital outlay as conventionally required with an inventory of CDs. Still further, when the content specific digital media products are activated at the retail location, payment for the content specific digital media products is obtained. Other parties involved in the sale of content specific digital media products, including product provider, processing intermediary, content owner, etc. also get paid promptly. Still further, the content specific digital media products may be sized similar to the size of CDs so that the content specific digital media products are able to be used on the same display arrangements that a third-party retailer would otherwise use to display CDs. In addition, inventory management issues are substantially simplified with the use of content specific digital media products, as there is essentially no critical need to track units of the digital media products, and no need for a third-party retailer to return unsold inventory of content specific digital media products to an originating retailer, distributor or wholesaler for credit.

Referring initially to FIGS. 1A-1E, a content specific digital media product for a media collection will be described in accordance with an embodiment of the present invention. Although the content specific digital media product may be associated with a collection of digital content, as for example songs, podcasts, videos, audiobooks, television shows, and/or games for ease of discussion, the collection is generally described as being a playlist or album.

FIG. 1A is a diagrammatic representation of a front side or surface of a card according to one embodiment of the invention. A front surface of card 100 includes a representation 104 of a playlist (e.g., album) that is associated therewith. Card 100 may generally be formed from any suitable material including, but not limited to, paper, plastic, or a reflective material such as holofoil. Suitable materials may include, but are not limited to, plastics, such as polyvinyl chloride (PVC) or more environmentally friendly plastics such as corn-based plastics (e.g., polylactic acid (PLA)). In one embodiment, if card 100 is associated with an album released by a musical artist or group, representation 104 may be a representation of the album cover. Alternatively, if card 100 is associated with a playlist that has not been released, e.g., if card 100 is associated with a recording made at a live concert, representation 104 may be a portrayal such as a photograph, illustration, or other artistic rendering arranged to identify an artist, group, recording, event, or title (name) associated with the playlist. Optionally, the representation 104 can be a holographic image or an image with a holographic effect.

The front surface of card 100 may also include a site identifier 112 that identifies a website or an application from which the associated playlist may be obtained. By way of example, site identifier 112 may identify the iTunes® online media store owned by Apple Inc. of Cupertino, Calif. as an online store from which the playlist is to be obtained. The front surface of card 100 may also include a price 108 associated with purchase of the card for electronic access to an instance of the playlist. In other words, price 108 indicates a cost associated with downloading the playlist from the online store identified by side identifier 112.

In general, card 100 may be sized to fit into standard slots or bins used to hold CDs or gift cards at retail outlets such as third-party retail outlets or reseller locations. When CD-sized, the height of card 100 may be approximately 16.5 cm, while the width of card 100 may be approximately 12 cm. When gift card-sized, the height of card 100 may be approximately 11.5 cm, while the width of card 100 may be approximately 8.5 cm. As shown in FIG. 1D, card 100 may have an associated thickness "t" 148 that may be in the range of approximately 24-30 mils. It should be understood that the size of card 100 may vary widely. By way of example, thickness "t" 148 may be in the range of approximately 2 mils to approximately 100 mils. Additionally, by way of example, the height of card 100 may be approximately 5.25 inches while the width of card 100 may be approximately 4.5 inches, e.g., the height may be in the range between approximately 4 inches and approximately 5 inches while the width may be in the range between approximately 3 inches and approximately 5 inches.

Card 100 is not limited to being displayed in bins at retail outlets. In many retail outlets, gift cards and the like are displayed in a hanging manner, e.g., openings defined within gift cards or gift card holders are used to enable the gift cards to be hung on dowels or other support apparatus. If card 100 is to be displayed in, or is likely to be defined in, a hanging manner, an opening 116 may be included on card 100. Such an optional opening 116 may generally take substantially any suitable shape, such as a "sombrero" shape as shown, a circular shape, or an ovular shape.

Figure 1B:
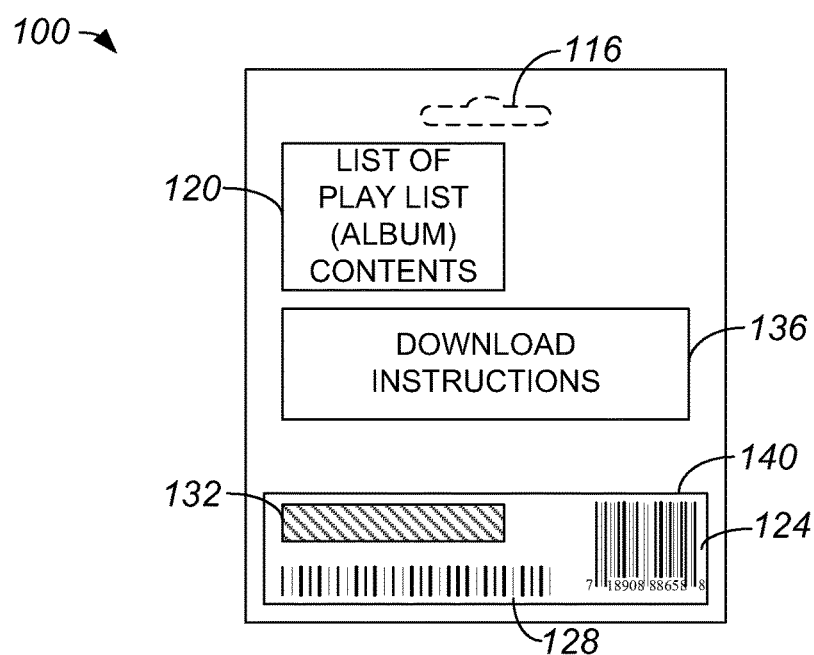
FIG. 1B is a diagrammatic representation of a back of a card, i.e., card 100 of FIG. 1A, that includes a bar code and a unique code that is concealed in accordance with an embodiment of the present invention.

As shown in FIG. 1B, the back side of card 100 may include a list 120 of playlist contents. Card 100 may also include download instructions 136 which allow a possessor of card 100 to obtain the digital files associated with list 120. List 120 identifies tracks associated with the playlist, while download instructions 136 provide instructions intended to guide a possessor of card 100 through a process of downloading digital files or tracks associated with list 120.

The back side of card 100 also includes a purchase information section 140. Purchase information section 140 generally includes information which may be used in the purchase of card 100, the activation of card 100, and the downloading of digital files associated with list 120. A universal product code (UPC) code 124 and/or bar code 128, which are arranged to be scanned as a part of an activation process, may be included in purchase information section 140. UPC code 124 may be used at a point-of-sale to effectively charge price 108 to a purchaser for the purchase of card 100 or, more specifically, the activation of card 100.

Bar code 128, which may be read by optical scanners or bar code readers, may include information that identifies card 100. It should be understood that the format of bar code 128 may vary widely. By way of example, bar code 128 may be encoded in a code 128, a code 93, or a datamatrix 2D bar code format.

Figure 1C:
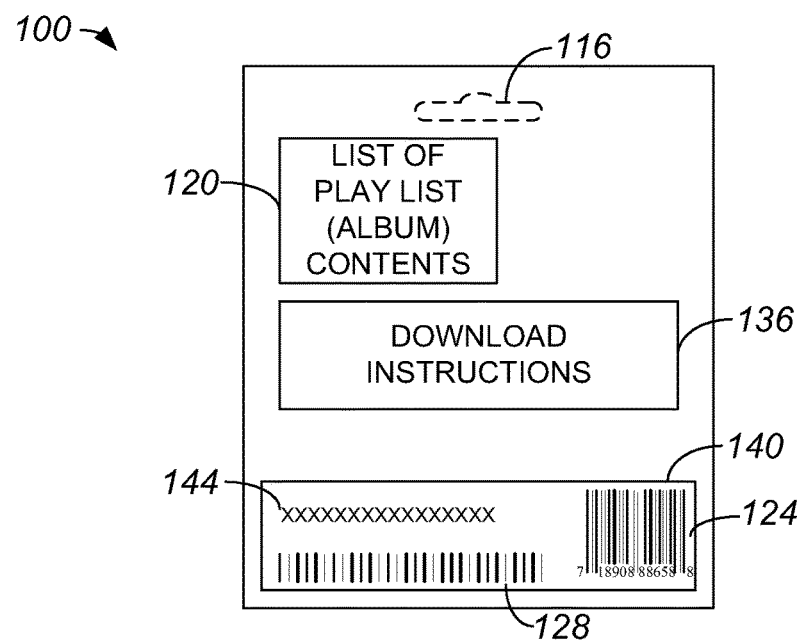
FIG. 1C is a diagrammatic representation of a back of a card, i.e., card 100 of FIGS. 1A and 1B, on which a unique code is revealed in accordance with an embodiment of the present invention.
Figure 1D:
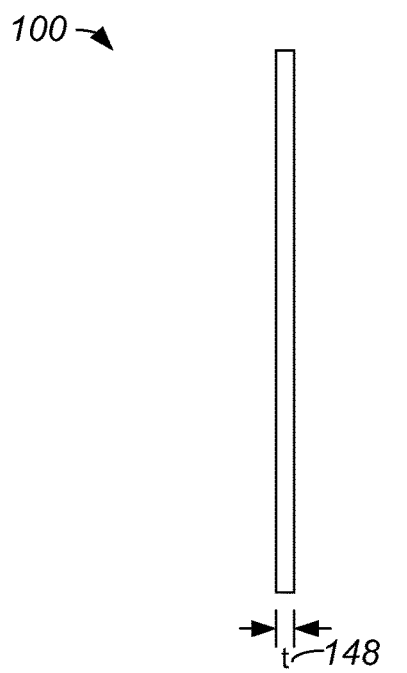
FIG. 1D is a diagrammatic side-view representation of a card, i.e., card 100 of FIG. 1A, in accordance with an embodiment of the present invention.

A concealed unique code 132 is provided in purchase information section 140 A unique code 144, as shown in FIG. 1C, is concealed (or obscured) by a scratch-off material for security purposes, as shown by concealed unique code 132 of FIG. 1B. Concealed unique code 132 may include an adhesive strip that is peeled off to expose unique code 144, or a scratch-off label that is scratched off to expose unique code 144. Unique code 144 is arranged to identify the playlist to be downloaded when unique code is provided to, or entered into, an appropriate website. While unique code 144 may generally include any number of characters, e.g., numbers, unique code 144 includes approximately sixteen characters in the described embodiment. It should be appreciated that until purchase information section 140 is processed at a point-of-sale of card 100, i.e., until at least one element included in purchase information section 140 is processed to activate card 100, card 100 is essentially worthless in that digital files associated with list 120 cannot be accessed, because unique code 144 is inactive. That is, unique code 144 is not redeemable for the digital files associated with list 120 until card 100 is activated at a point-of-sale.

Figure 1E:
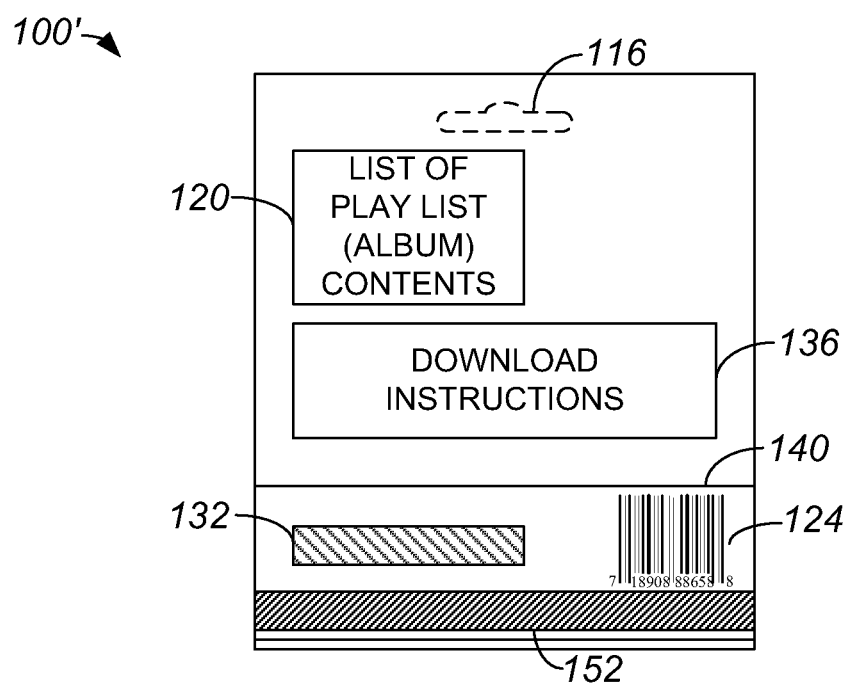
FIG. 1E is a diagrammatic representation of a back of a card, i.e., card 100 of FIG. 1A that includes a magnetic reader strip and a unique code that is concealed in accordance with an embodiment of the present invention.

Purchase information section 140 may include a magnetic stripe 152, in lieu of a bar code, as shown in FIG. 1E. In general, purchase information section 140 may also include both a magnetic stripe and a bar code. As will be appreciated by those skilled in the art, magnetic stripe effectively contains information that allows data stored remotely to be accessed by swiping magnetic stripe 152 past a card-reader head. A card reader head may be part of a point-of-sale device, Typically, magnetic stripe 152 is contained in a plastic-like film. As one example, magnetic stripe 152 may be located approximately 0.223 inches from the bottom edge of card 100, and may have a height of approximately 0.375 inches.

Figure 2:
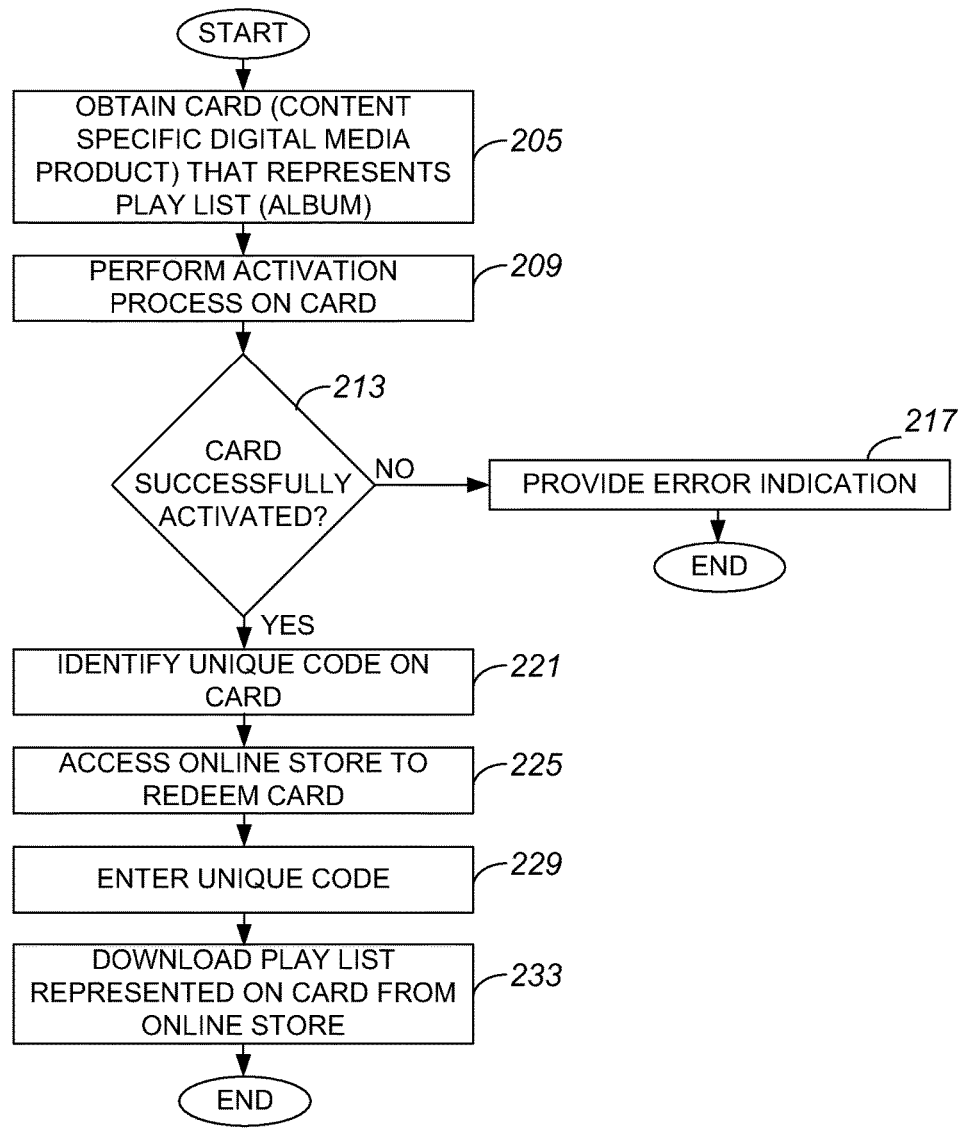
FIG. 2 is a process flow diagram which illustrates a method of obtaining a playlist or album in accordance with an embodiment of the present invention.

With reference to FIG. 2, one process by which a digital media product may be used to download a playlist will be described in accordance with an embodiment of the present invention. A process 201 of obtaining a playlist begins at step 205 in which a content specific digital media product, such as a card, that represents a playlist (e.g., album) is obtained. Obtaining a card may include selecting the card at a retail outlet or at a reseller location. Hereinafter, for ease of discussion, a digital media product will generally be referred to as a card, and a playlist will be described as either a playlist or an album. It should be appreciated, however, that a card is one example of a content digital media product, and an album is but one example of a playlist.

After a card that represents a playlist is obtained, an activation process is performed on the card in step 209. An activation process may include a potential purchaser providing the card to a point-of-sale device, and the point-of-sale device being used to communicate with appropriate data store arrangements to ascertain whether the card may be activated. An activation process may also include a determination of whether the would-be owner of the card has the resources to pay for the card, and if payment tendered for the card is acceptable. One activation process will be discussed below with reference to FIG. 3. Once the activation process on the card is completed, it is determined in step 213 whether the card was successfully activated. If it is determined in step 213 that the card was not successfully activated, the indication may be that the card is either invalid or already activated. Accordingly, in step 217, an error indication is provided to the point-of-sale device on which the activation attempt was made. The error indication may be provided as a "failure to activate" message. The process 201 of obtaining a playlist is terminated after the error indication is provided.

Alternatively, if it is determined in step 213 that the card was successfully activated, then process flow moves to step 221 in which the unique code on the card is identified. In one embodiment, identifying the unique code may include scratching off a scratch-off label that conceals the unique code. Upon identifying the unique code, an online store, from which a playlist associated with the card may be obtained, is accessed in step 225. Accessing an online store may include using a media management application (e.g., iTunes®) to access an online media store, or may include using a network browser (web browser) to access an online media store by entering a hypertext transfer protocol (http) web address.

Once the interface website is accessed to enable the card to be redeemed for the associated playlist, the unique code is provided to the online media store/website in step 229. Providing the unique code to the online media store/website allows identification of the playlist associated with the unique code. After the unique code is provided to the online media store/website, the playlist may be downloaded from the online media store/website in step 233. The process 201 of obtaining a playlist is completed when the playlist is downloaded.

Figure 3:
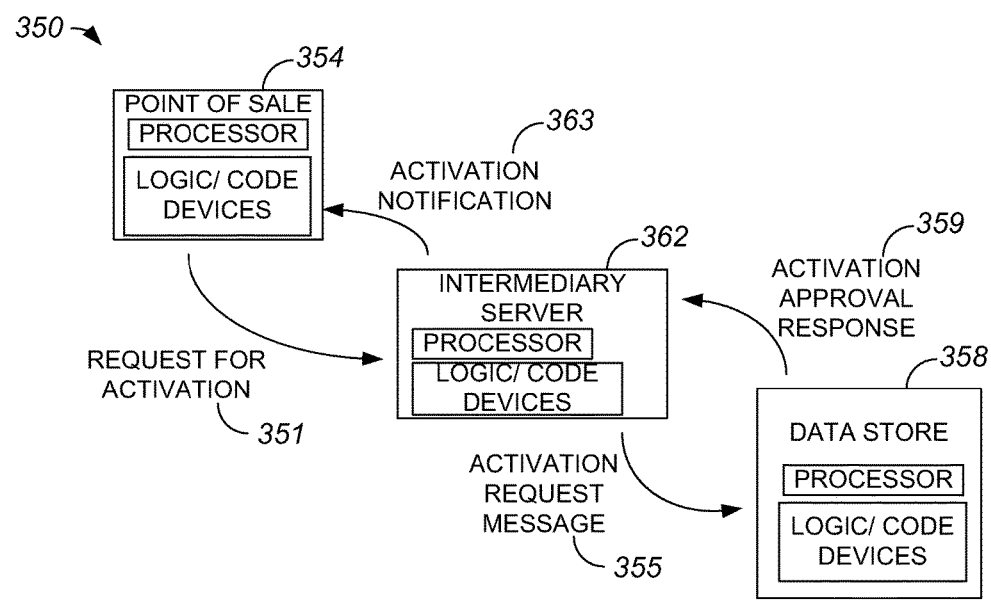
FIG. 3 is a block diagram representation of an overall system that authenticates and activates a playlist in accordance with an embodiment of the present invention.

Typically, an activation process performed on a card may involve communications between multiple devices. By way of example, a point-of-sale device may communicate with a data store arrangement on which information pertaining to a card is stored through an intermediary server. FIG. 3 is a block diagram representation of an example of an overall system that authenticates and effectively activates a digital media product, such as a card, in accordance with an embodiment of the present invention. A system 350 which allows an authentication process to occur includes a point-of-sale device 354, an intermediary server 362, and a data store arrangement 358. Point-of-sale device 354, intermediary server 362, and data store arrangement 358 are generally in communication over a network that may include either or both wired and wireless connections.

Point-of-sale device 354 may be a computing device associated with a retail location at which a card (not shown) is purchased. Alternatively, point-of-sale device 354 may be a client computing system owned by a purchaser who is attempting to purchase a card substantially on-line, e.g., such that a physical card is mailed to a recipient upon completion of an on-line purchase. Data store arrangement 358 may be associated with a company that provides digital files for download. For example, data store arrangement 358 may include data stores and applications associated with the iTunes® online media store owned and operated by Apple Inc. Intermediary server 362 may be a server associated with an entity that is arranged to obtain information from point-of-sale device 354, and to facilitate communications between point-of-sale device 354 and data store arrangement 358 during an activation process. Intermediary server 362 may be arranged to store information associated with a card (not shown), and to aggregate information associated with multiple data store arrangements. An example of intermediary server 362 is a platform available commercially from InComm of Atlanta, Ga.

When point-of-sale device 354 scans or otherwise reads a card (not shown) that is to be activated, point-of-sale device 354 sends a request 351 for activation to intermediary server 362. Upon receiving request 351, intermediary server 362 effectively converts information scanned and provided by point-of-sale device 354 into an identification number (e.g., serial number), identifies data store arrangement 358 as being suitable for use in activating the card, and provides the identification number to data store arrangement 358 in an activation request message 355. Data store arrangement 358 utilizes information contained in activation request message 355 to determine whether the card (not shown) may be activated.

Once data store arrangement 358, which may include a database server and a database, determines whether the card may be activated, data store arrangement 358 sends an activation approval response 359 to intermediary server 362. Activation approval response 359 typically includes an indication of whether or not the card has been activated in response to activation request message 355. For example, a card that was previously sold and activated will be denoted as already having been activated. In one embodiment, data store arrangement 358 may activate the card or transition the card from an inactive state to an active state, and update itself to indicate that the identification number associated with the card has been activated and, hence, may now be used to redeem the associated playlist.

Intermediary server 362 receives activation approval response 359 from data store arrangement 358, and provides an activation notification 363 to point-of-sale device 354. Activation notification 363 is arranged to indicate whether the card has been activated.

Point-of-sale device 354, intermediary server 362, and data store arrangement 358 each perform some processing as a part of an overall activation process. Each contains hardware logic and/or software code devices that are executable to cause parts of the overall activation process to be implemented. Software code devices may be stored on computer-readable media, as for example memories or memory devices. Software code devices may also be embodied in carrier waves or data signals.

Figure 4:
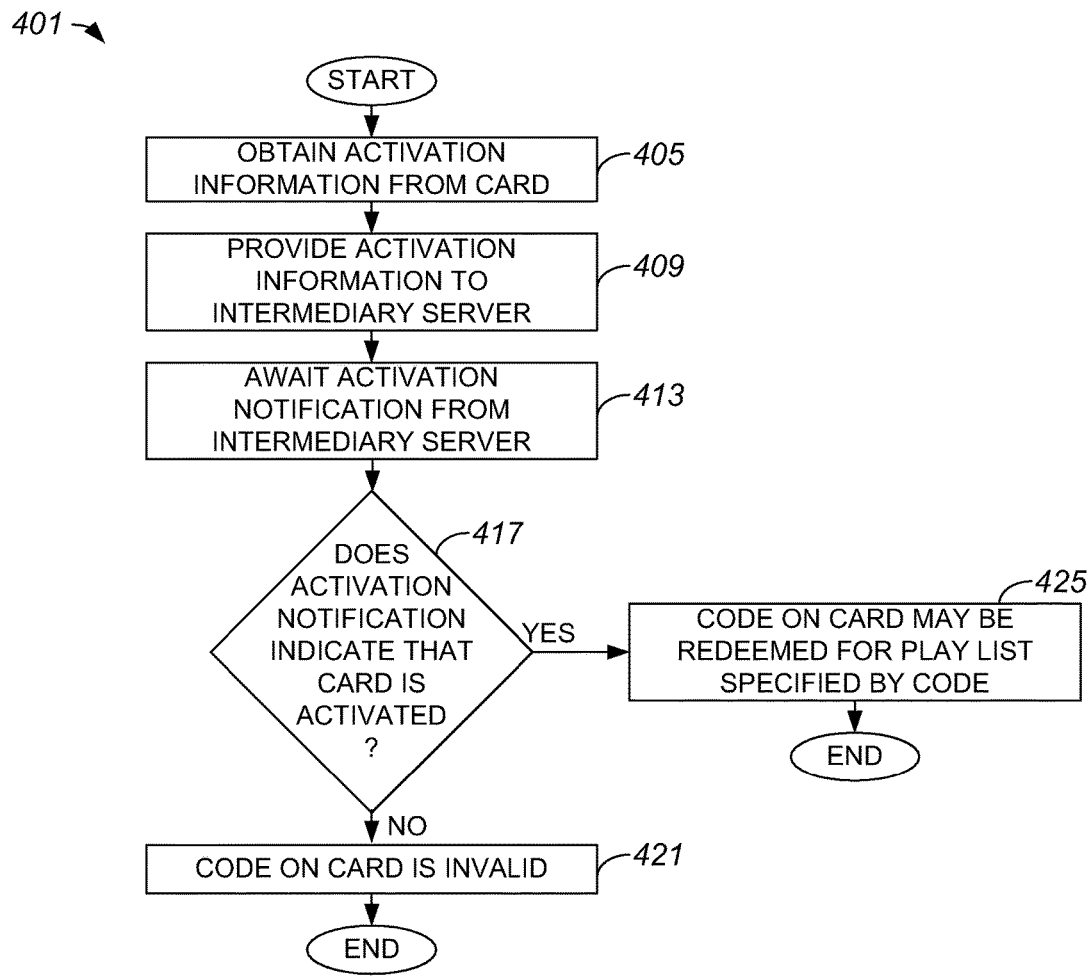
FIG. 4 is a process flow diagram which illustrates a method implemented by a point-of-sale device to activate a card in accordance with an embodiment of the present invention.

FIG. 4 is a process flow diagram which illustrates a method implemented by a point-of-sale device to activate a card in accordance with an embodiment of the present invention. A process 401 of activating a card from the point of view of a point-of-sale device begins at step 405 in which activation information is obtained from a card. The activation information may be obtained from the card by substantially scanning the card using the point-of-sale device. Once the activation information is obtained, the activation information is provided to an intermediary server in step 409, e.g., over a network connection. After the activation information is provided to the intermediary server, the point-of-sale device awaits an activation notification from the intermediary server in step 413.

When an activation notification is received, it is determined in step 417 if the activation notification indicates that the card is activated. If it is determined that the activation notification indicates that the card is activated, then the unique code associated with the card is effectively "live," and therefore may be redeemed in step 425. In other words, if the card is activated, then the unique code that is generally printed on the card is redeemable for the playlist specified by or otherwise associated with the unique code. Once the unique code on the card becomes redeemable for the playlist specified by the unique code, the process 401 of activating a card from the point of view of a point-of-sale device is completed. It should be appreciated that although the process of activating a card typically includes tendering payment for the card, steps associated with tendering payment for the card have not been shown for ease of illustration.

Alternatively, if it is determined in step 417 that the activation notification indicates that the card has not been activated, the indication in step 421 is that the unique code on the card is invalid. A code may effectively be invalid if it has previously been activated and/or redeemed. After the code on the card is determined to be invalid, the process 401 of activating a card from the point of view of a point-of-sale device is completed.

Figure 5:
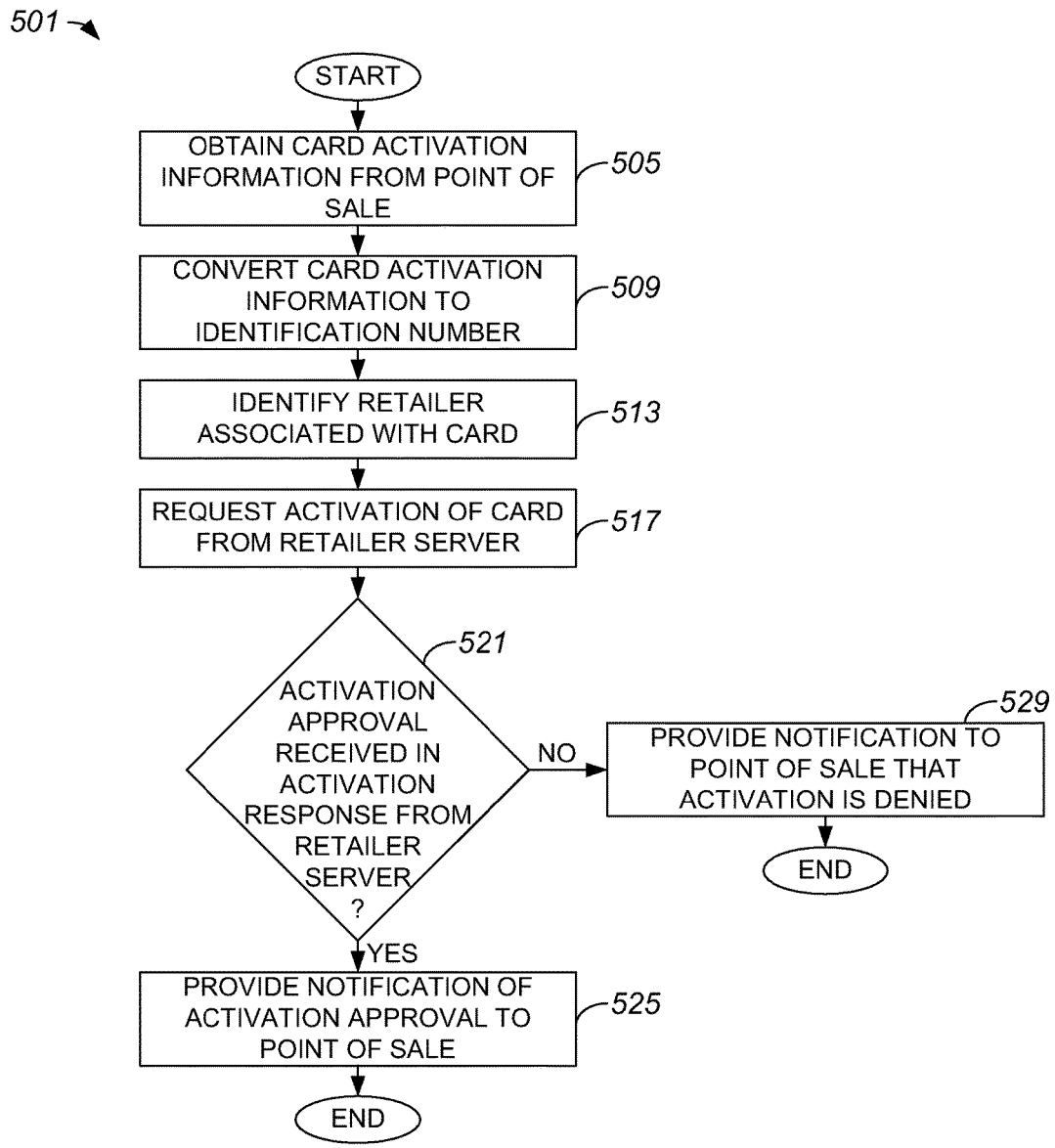
FIG. 5 is a process flow diagram which illustrates a method implemented by an intermediary server to activate a card in accordance with an embodiment of the present invention.

FIG. 5 is a process flow diagram which illustrates a method implemented by an intermediary server to activate a card in accordance with an embodiment of the present invention. A process 501 of activating a card from the point of view of an intermediary server, or a server that facilitates communications between a point-of-sale device and a data store arrangement, begins at step 505 in which card activation information is obtained from a point-of-sale device. In one embodiment, the card activation information includes card identifying information provided in a message transmitted by the point-of-sale device to the intermediary server.

After the card activation information is obtained, the card activation information may be converted to a identification number associated with the card in step 509. As will be appreciated by those skilled in the art, converting or otherwise obtaining a identification number using the card activation information may include applying an algorithm to the activation information to substantially extract the identification number from the activation information.

In step 513, the retailer or provider associated with the card is identified. The retailer associated with the card is the retailer or organization that maintains digital files that are obtained by redeeming the unique code associated with the card. Identifying the retailer associated with the card allows the intermediary server to identify a data store arrangement or a retailer server to access in order to activate the card. Once the retailer associated with the card is identified, the intermediary server sends an activation request, or a request to activate the card, to the retailer server in step 517. In one embodiment, the request to activate the card includes the identification number for the card.

A determination is made in step 521 as to whether an activation approval is received in an activation response from the retailer server in response to the activation request. In general, if an activation response is not received within a predetermined amount of time, the indication is that the card is not approved for activation. The lack of receiving an activation response is typically considered as a lack of approval for activation. In one embodiment, an activation response may be received from a data store arrangement or retailer server that may contain either an indication that activation is approved or an indication that activation is not approved.

If it is determined in step 521 that no activation approval was received in an activation response from a retailer server, the indication is that the request for activation was denied. Accordingly, in step 529, the intermediary server provides a notification to the point-of-sale device that activation of the card is denied, and the process 501 of activating a card is completed. Alternatively, if the determination in step 521 is that activation approval was received from the retailer server, the intermediary server provides a notification of activation approval to the point-of-sale device in step 525, and the process 501 of activating a card is completed.

Figure 6:
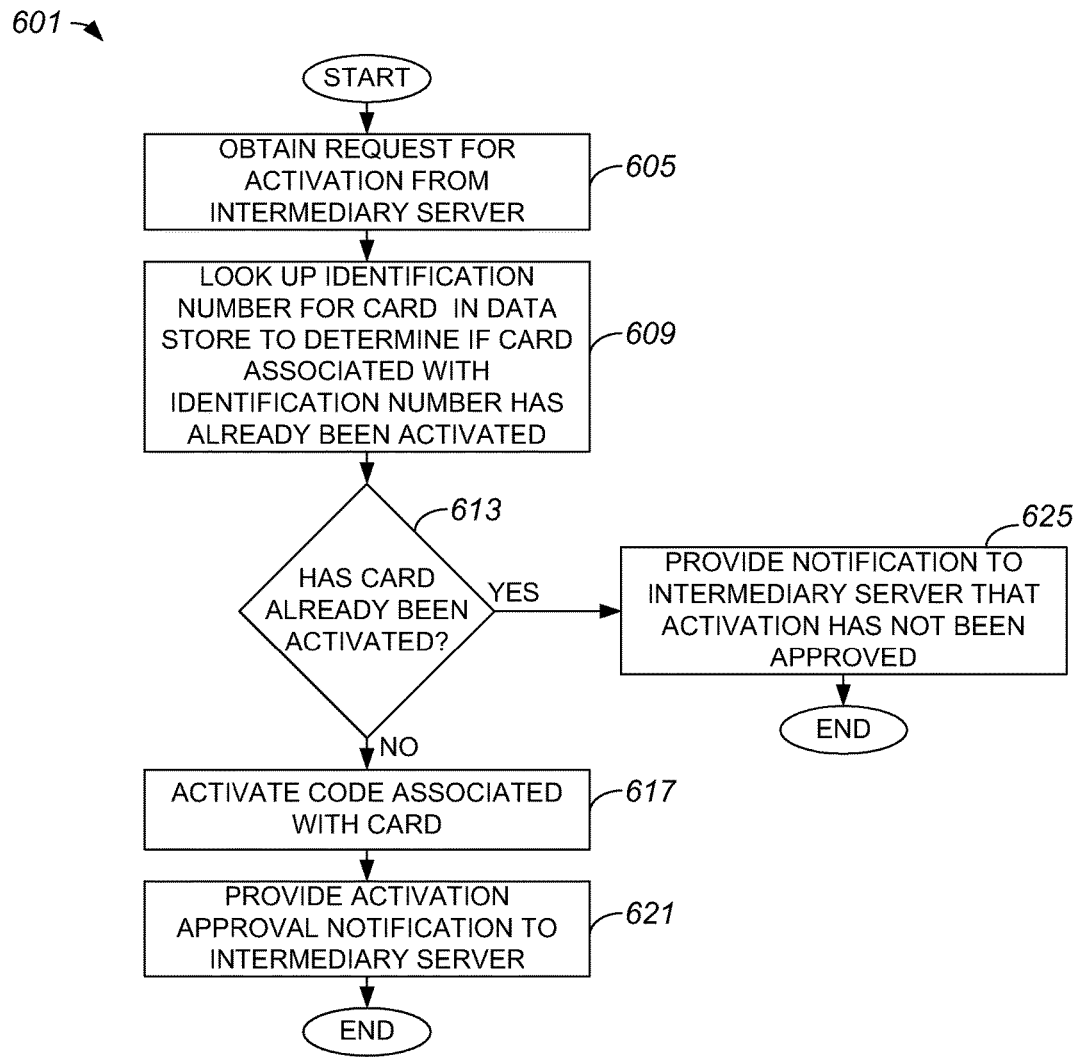
FIG. 6 is a process flow diagram which illustrates a method implemented by a data store arrangement to activate a card in accordance with an embodiment of the present invention.

FIG. 6 is a process flow diagram which illustrates a method implemented by a data store arrangement associated with a retailer to activate a card in accordance with an embodiment of the present invention. A process 601 of activating a card from the point of view of a data store arrangement that stores information related to a card begins at step 605 in which the data store arrangement obtains, e.g., receives, a card activation request from an intermediary server. In general, the request may be received over a network, and includes a identification number for the card to be activated. Once the card activation request is obtained, the data store arrangement uses the identification number of the card, which is included in the card activation request, to ascertain whether the card has previously been activated in step 609. That is, the data store arrangement determines whether the identification number of the card indicates that the card is already activated. Typically, the data store arrangement will include a data store or a database in which records relating to a plurality of cards are stored. By way of example, a record for a card may include the identification number for the card, the unique code associated with the card, an indication of whether the card has been activated, and an indication of whether the card has effectively been redeemed. The record for the card may also include an identifier which identifies the playlist associated with the card.

After the identification number for the card is looked up in step 609, it is determined in step 613 if the card has already been activated. If it is determined that the card has already been activated, then a notification is provided in step 625 to the intermediary server. The notification may indicate that the card has previously been activated and, hence, the current activation process has not resulted in an activation of the card. Upon providing a notification to the intermediary server, the process 601 of activating a card is completed.

Alternatively, if the determination in step 613 is that the card has not already been activated, then the card is effectively activated in step 617. In other words, the unique code associated with the card is activated. Generally, activating the card includes updating a record in a data store associated with the card to indicate that the card has been activated. Once the code associated with the card is activated, process flow moves to step 621 in which an activation approval notification is provided to the intermediary server in step 621, i.e., the intermediary server is notified that the card was successfully activated. Upon notifying the intermediary server of a successful activation, the process 601 of activating a card is completed.

Figure 7:
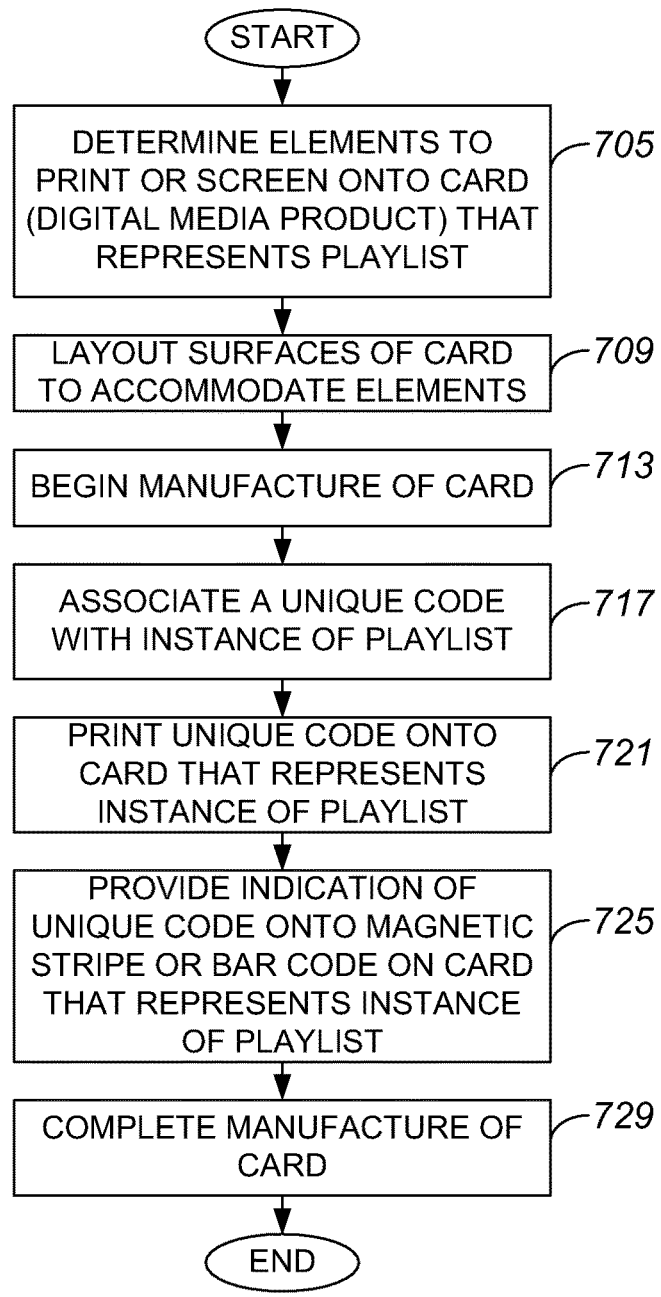
FIG. 7 is a process flow diagram which illustrates a method of forming a card in accordance with an embodiment of the present invention.

A digital media product that includes a unique code which is invalid and unusable for redeeming a predetermined playlist until activation may be fabricated using a variety of different methods and processes. Referring next to FIG. 7, one method of forming a digital media product will be described in accordance with an embodiment of the present invention. A process 701 of forming a digital media product (e.g., card) that is a representation of a playlist (e.g., album) begins at step 705 in which elements that are to be included on the card are identified. In one embodiment, elements that are to be represented, e.g., printed or screened, onto the card are determined. It should be appreciated that the elements may differ depending, for example, on the requirements of particular retail outlets that are to display and sell the cards. The elements generally include, but are not limited to including, a representation associated with the playlist, a name or description of the playlist, and a list of tracks included in the playlist. The elements to be included on the card may also include an element that represents a price of the playlist, an element such as a UPC code that may be scanned at a point-of-sale as a part of a card activation process, and a unique code that may be used, when the card is activated, to redeem the playlist. In one embodiment, determining elements to print, image, or otherwise fabricate onto the card may include determining a price for the playlist. The price charged for the playlist when the playlist is purchased by purchasing the card may be lower than the price charged for the playlist otherwise, e.g., if the playlist is substantially directly purchased from the website that allows the playlist to be downloaded.

After the elements to be included on the card are determined, the surfaces of the card may effectively be laid out in step 709. That is, the positioning of elements on the front and back surfaces of the card is determined. The layout of the surfaces of the card may generally be created using any suitable computer-aided design or drawing tool. Then, in step 713, the manufacture of the card is initiated. The manufacture of the card may include, but is not limited to, selecting a material from which to fabricate a card, selecting materials to use to print the card, and tooling a manufacturing line to fabricate the card. In one embodiment, the manufacture of a card includes providing holographic images on at least one surface of the card.

Once the manufacture of the card is initiated, a unique code, e.g., a unique redemption code, is associated with the card in step 717. More generally, each instance of a playlist that is associated with a card is associated with a unique code. That is, each card has a unique code that allows that specific physical card to effectively be redeemed. The unique code is arranged to identify the playlist when the unique code is provided to an online store, such as the iTunes store. Upon associating the unique code with the card, the unique code is printed onto the card in step 721. It should be appreciated that printing the unique code onto the card may include covering the unique code with a scratch-off material. Then, in step 725, the identification number, or an indicator that identifies the identification number, is provided onto a magnetic stripe and/or bar code on the card. Finally, in step 729, the manufacture of the card is completed, and the process 701 of forming a card is completed. The steps associated with completing the manufacture of the card may include, but is not limited to including, cutting the card from a sheet. It should be appreciated, however, that the cutting of the card may precede the coding of the unique code onto the magnetic stripe and/or bar code.

Figure 8:
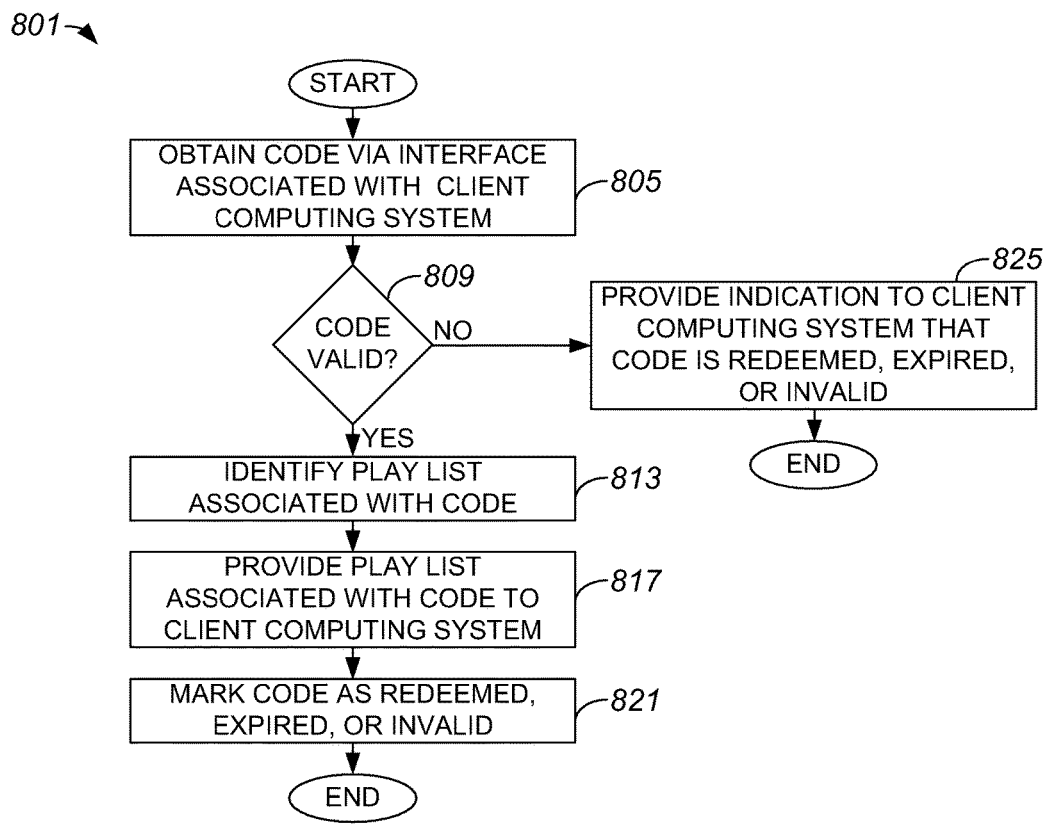
FIG. 8 is a process flow diagram which illustrates steps associated with one method of processing a unique code provided to a data store arrangement in accordance with an embodiment of the present invention.

As previously mentioned, after a card and its associated unique code are activated, the unique code may be redeemed or otherwise processed to effectively procure the playlist identified by the unique code. FIG. 8 is a process flow diagram which illustrates steps associated with one method of redeeming or otherwise processing a unique code provided to a data store arrangement from the point of view of the data store arrangement in accordance with an embodiment of the present invention. A process 801 of redeeming a unique code for an associated playlist begins at step 805 in which the code is obtained by the data store arrangement, i.e., the data store arrangement associated with a retailer that provides digital audio or video files for download. The unique code is generally obtained from a client computing system via a network interface. The client computing system may be substantially any system with processing power that may be communicate with the data store arrangement. Suitable client computing systems include, but are not limited to including, personal computers, and mobile digital devices such as portable digital media players and mobile telephones.

After the unique code is obtained, it is determined in step 809 whether the unique code is valid. Such a determination may be made by indexing into records stored in a data store or database based on the unique code, and determining if the unique code is marked as already redeemed or not yet activated. In one embodiment, a unique code may remain valid for a predetermined amount of time, and is considered expired and unredeemable if the predetermined amount of time has elapsed. An already redeemed code may generally also be considered as being expired. If it is determined that the unique code is not valid, an indication that unique code may not be redeemed is provided to the client computing system in step 825, and the process 801 of redeeming a unique code is completed. In general, an indication provided to the client computing system may indicate that the unique code has already been redeemed, is expired, or is otherwise invalid.

Alternatively, if it is determined in step 809 that the unique code is valid, then the playlist associated with the unique code is identified in step 813. Then, in step 817, the playlist identified in step 813 is provided to the client computing system. In other words, a copy of the electronic files associated with the playlist is provided or otherwise downloaded onto the client computing system. Once the playlist is provided to the client computing system, the unique code is marked as redeemed, expired, or otherwise invalid in step 821. Marking the unique code as redeemed, expired, or otherwise invalid typically includes placing an indicator in a record associated with the unique code that indicates that the unique code has effectively been used. Upon marking the code as redeemed, expired, or otherwise invalid, the process 801 of redeeming a unique code is completed.

Figure 9:
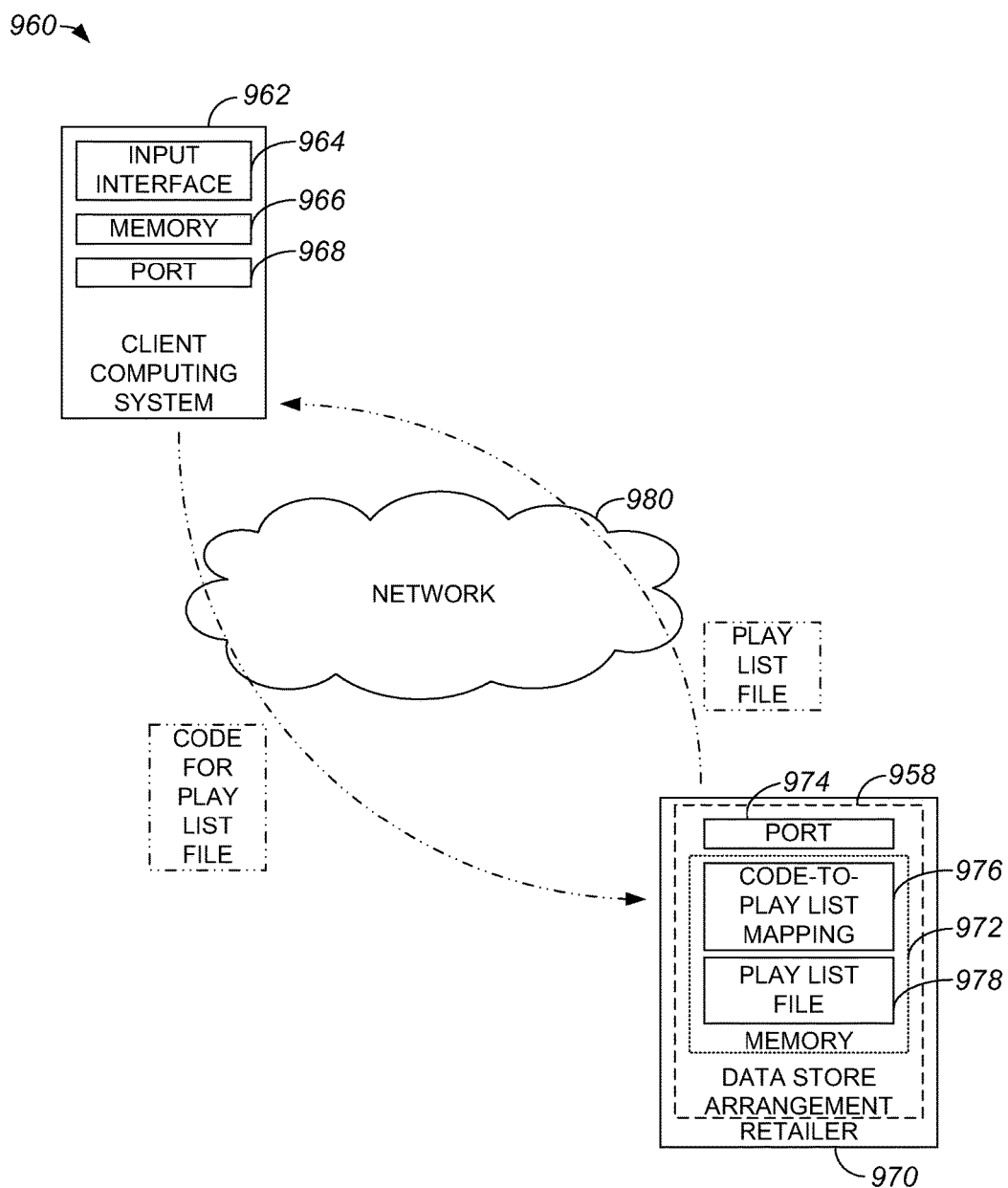
FIG. 9 is a block diagram representation of an overall system that allows a possessor of a card to obtain an associated playlist in accordance with an embodiment of the present invention.

FIG. 9 is a block diagram representation of an overall system that allows a possessor of a card to obtain an associated playlist in accordance with an embodiment of the present invention. An overall system 960 includes a client computing system 962 and a retailer system 970 that are in communication over a network 980. Client computing system 962 includes an input interface 964 into which an identification number or a unique code may be entered, a memory 966 that stores any files obtained from retailer system 970, and a port 968 that allows client computing system 962 to access network 980.

Retailer system 970 is arranged to be accessed via network 980 such that client computing system 962 may obtain a playlist file 978 that corresponds to the unique code. The unique code may be provided by input interface 962 via network 980 to a data store arrangement 958 of retailer system 970. Data store arrangement 958 includes a port 974 that allows communications to be sent and received via network 980, as well as a data store or memory 972 that stores data store records. The records may include a code-to-playlist mapping 976 that provides allows playlists associated with unique codes to be identified. In general, memory 972 also includes records (not shown) that indicate whether unique codes are valid or invalid. Memory 972 also includes at least one playlist file 978. In one embodiment, playlist file 978 represents a list of media items that are deemed within the playlist. The media items within the list can be linked to corresponding digital media files. In another embodiment, playlist file 978 may include a collection of digital media files, e.g., digital audio files in a AAC format, that are associated with a particular playlist. Playlist file 978 may also include information that is arranged to associate the digital audio files with one another, as for example to define a playlist. Alternatively, playlist file 978 may be a single digital media file.

As shown, when client computing system 962 provides an identification number or unique code associated with playlist file 978 to data store arrangement 958 via network 980, data store arrangement 958 returns playlist file 978 to client computing system 962 via network 980. In this regard, the digital media files pertaining to media items within the playlist are provided to the client computing system 962. Once playlist file 978, or an instance of playlist file 978, is provided to client computing system 962, playlist file 978 may be stored into memory 966.

Although only a few embodiments of the present invention have been described, it should be understood that the present invention may be embodied in many other specific forms without departing from the spirit or the scope of the present invention. By way of example, albums or playlists that are represented by cards may be associated with commercial albums, as for example albums that have been released by artists on conventional media such as CDs or digital versatile discs (DVDs), albums or playlists that are represented by cards may be associated with any suitable catalog of music. For instance, a playlist represented by a card may represent a portion of a commercial album, or may be associated with a live concert that was not complied into a commercial album on a CD or a DVD.

The types of content associated with a card may vary widely. For example, a card may advertise or promote a television show that may be obtained using a unique code on the card. A card may also advertise or promote at least one video that may be obtained using a unique code on the card, at least one song that may be obtained using a unique code on the card, or at least one movie that may be obtained using a unique code on the card. In one embodiment, a card may advertise or promote any combination of television shows, videos, songs, audiobooks and/or movies. That is, a card may be associated with a mixed content playlist. A combination may include, but is not limited to including, a television show and an associated soundtrack for the television show.

Communications between a point-of-sale device, an intermediary server, and a data store arrangement may generally be encrypted for security purposes. It should be appreciated that substantially any encryption algorithm or method may be used to ensure the security of transmissions associated with the activation of a card.

In general, the elements displayed on the front and the back of a digital media product or card may vary widely. For instance, in addition to, or in lieu of, elements discussed with respect to FIGS. 1A-1E, elements that are specific to retail outlets may be included on the card. By way of example, an icon that identifies a retail outlet in which the card is being sold may be included on a front surface of the card. Additionally, a list of bonus material within or otherwise associated with a playlist may be included on a surface of the card. The list of bonus material may include, but is not limited to including, a list of tracks or files.

As discussed above, the price associated with a card that represents a playlist may be lower than a price associated with the playlist alone. By way of example, a price paid to purchase a card that includes a unique code associated with a playlist is generally lower than a price paid to download the playlist without obtaining a card that includes a unique code. While the difference between the prices may vary, in one embodiment, the price paid for the playlist through the purchase of the card may be up to approximately fifty percent less than the price paid for the playlist when the purchase of the card is not involved.

The design of a card, i.e., the elements included on a card, and the price charged for the card may vary depending upon the retailer associated with the card and the requirements of retail outlets or resellers of the cards. For instance, one retail outlet or reseller may wish to have its corporate logo shown on a card, while another retailer may wish to have the cards formed in a particular size or shape without departing from the spirit or the scope of the present invention. Additionally, the overall design of a card may vary based upon the particular demographics that the card is intended to target. Further, cards may be created for particular playlists based on demographics, e.g., a card may be created for a playlist that is likely to be attractive to members of an age group targeted by a particular retail outlet.

A unique code is not limited to being used to allow a possessor of the unique code to obtain an associated playlist for downloading. In other words, a unique code may be arranged to effectively have a variety of attributes. Attributes included in a unique code may be configured to indicate that a possessor of the unique code is entitled to particular services or benefits. By way of example, a unique code may be configured such that when it is entered into an appropriate interface, it may then be determined that the possessor of the unique code is entitled to the right to pre-purchase tickets to a concert, sporting event, etc.

The steps associated with the methods of the present invention may vary widely. Steps may be added, removed, altered, combined, and reordered without departing from the spirit of the scope of the present invention. By way of example, a process of creating a card associated with a playlist may include consulting a musical artist or recording label to obtain a release or permission to include the playlist on the card. Therefore, the present examples are to be considered as illustrative and not restrictive, and the invention is not to be limited to the details given herein, but may be modified within the scope of the appended claims.

What is claimed is:

1. A digital media product associated with an online media store, the digital media product comprising:
   a visual element displayed on the digital media product, the visual element being arranged to identify a particular media collection, the media collection being associated with a plurality of digital media assets;
   code provided on the digital media product, the code being arranged to be transitioned from an inactivated state to an activated state, wherein the code identifies the particular media collection and allows the particular media collection to be obtained when the code in the activated state is provided to the online media store;
   an activation element provided on the digital media product, the activation element being arranged to cooperate with a remote activation system to transition the code from the inactivated state to the activated state, wherein the activation element includes at least a bar code that contains a first set of information associated with the code and a magnetic stripe that allows access to a second set of information associated with the code, and
   wherein the digital media product is in an activated state when the code is in the activated state, and wherein the digital media product is in an inactivated state when the code is in the inactivated state.

2. A digital media product of claim 1,
   wherein when the digital media product is in the inactivated state, the particular media collection is not redeemable from the online media store, and
   wherein, when the digital media product is in the activated state, the particular media collection is redeemable from the online media store.

3. A digital media product of claim 2, wherein the digital media product has monetary value when in the activated state.

4. A digital media product of claim 1 wherein prior to or concurrent with the transition of the code to the activated state at a retail location, the digital media product is purchased at the retail location.

5. A digital media product of claim 1 wherein the media collection is an album, and wherein the visual element is an album cover image of the album.

6. A digital media product of claim 1 wherein the visual element is an image associated with the media collection.

7. A digital media product of claim 6, wherein the digital media product further includes a listing of the digital media assets associated with the particular media collection.

8. A digital media product as recited in claim 1 wherein the particular media collection is available from the online media store without cost if the code from the digital media product is provided to the online media store and the digital media product is in an activated state.

9. The digital media product of claim 1 wherein the digital media product is formed from a plastic material.

10. The digital media product of claim 1 wherein the code includes sixteen characters, and wherein the code enables a single instance of the media collection to be electronically obtained when the code is provided to the online media store when in an activated state.

11. The digital media product of claim 1 wherein the second set of information associated with the code includes at least an identifier of the digital media product.

12. The digital media product of claim 1 wherein the digital media product is sized to fit at least partially into a bin that is arranged to hold and to display a compact disc (CD).

13. The digital media product of claim 1 wherein the media collection is a mixed content playlist that includes at least one digital audio file and at least one digital video file.

14. The digital media product of claim 1 wherein when the code is in the activated state, the media collection is redeemable from the online media store and wherein when the code is in the inactivated state, the media collection is not redeemable from the online media store.

15. A prepaid card for acquisition of a particular collection of digital media assets, said prepaid card comprising:
   an image representing the collection of digital media assets;
   a price for the card;
   a listing of the digital media assets in the collection;
   a unique code for the card, the unique code having an activated state and an inactivated state and being associated with the particular collection of digital media assets;
   a bar code that identifies the card, the bar code being arranged to cooperate with a remote intermediary activation system to transition the unique code from the inactivated state to the activated state;
   a magnetic stripe that allows access to a set of information associated with the code; and
   download instructions to redeem the card for the collection of digital media assets,
   wherein the particular collection of digital media assets are redeemable from an online store only when the unique code is in the activated state.

16. A prepaid card of claim 15 wherein the card has dimensions of approximately 4.5 inches by approximately 5.25 inches by approximately 24 mils.

17. A prepaid card of claim 16 wherein the card enables its purchaser to acquire a digital download of the collection of digital media assets without further cost.

18. A prepaid card of claim 15 wherein a digital download of the collection of digital media assets is obtainable using the unique code of the prepaid code without additional cost.

19. A prepaid card of claim 15 wherein the card has a first side and a second side, the first side including at least the image representing the collection of digital media assets and the price for the card, and the second side including at least the listing of the digital media assets in the collection, the download instructions, the bar code and the unique code.

20. A prepaid card of claim 15 wherein the collection of digital media assets includes at least one audio item and at least one video item.

21. A prepaid card of claim 20 wherein the collection further includes at least one electronic file that pertains to a digital non-media asset.

22. A prepaid card of claim 15 wherein the card is affiliated with an online media store,
wherein when the unique code is in the inactive state, the prepaid card is inactive and the particular media collection is not redeemable from the online media store, and
wherein, when the unique code is in the active state, the particular media collection is redeemable from the online media store.

23. A prepaid card of claim 15 wherein the prepaid card has monetary value when the unique code is in the activated state.

24. A prepaid card of claim 15 wherein the media collection is an album, and wherein the image is an album cover image of the album.

25. A prepaid card of claim 15 wherein the particular media collection is available from an online media store without further cost if the code, provided to the online media store, is in the activated state.

26. A prepaid card of claim 15 wherein the image is a holographic image.

27. A digital media product associated with an online media store, the digital media product comprising:
a visual element displayed on the digital media product, the visual element being an image associated with an album cover image of a media collection, the media collection being associated with a plurality of digital media assets, the plurality of digital media assets including at least one audio item, at least one video item, and at least one electronic file that pertains to a digital non-media asset;
a code provided on the digital media product, the code being arranged to be transitioned from an inactivated state to an activated state, wherein the code identifies the particular media collection and allows the particular media collection to be obtained when the code in the activated state is provided to the online media store; and
an activation element provided on the digital media product, the activation element being arranged to cooperate with a remote activation system to transition the code from the inactivated state to the activated state,
wherein the activation element includes at least a bar code that contains a first set of information associated with the code and a magnetic stripe that allows access to a second set of information associated with the code, and
wherein the digital media product is in an activated state when the code is in the activated state, and wherein the digital media product is in an inactivated state when the code is in the inactivated state.

* * * * *